United States Patent Office 3,546,163
Patented Dec. 8, 1970

3,546,163
POLYMERS CONTAINING SULPHUR-
CONTAINING ANTIOXIDANTS
Hans Jakob Peterli, Fullinsdorf, Basel-Land, and Hansjörg
 Heller, Riehen, Switzerland, assignors to Geigy Chemical Corporation, Ardsley, N.Y., a corporation of New York
No Drawing. Original application Feb. 3, 1967, Ser. No. 613,730. Divided and this application Mar. 6, 1969, Ser. No. 822,344
Claims priority, application Switzerland, Feb. 8, 1966, 1,759/66
Int. Cl. C08f 45/58
U.S. Cl. 260—45.95    5 Claims

ABSTRACT OF THE DISCLOSURE

Diphenylalkylmercaptans of the formula

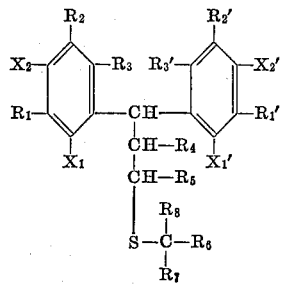

wherein
one of $X_1$ and $X_2$ and one of $X_1'$ and $X_2'$ represents the hydroxyl group and the other represents hydrogen,
$R_1$ and $R_1'$ each represent an alkyl group having, in all, 3 to 20 carbon atoms in a chain which is branched at the α-carbon atom, which alkyl group can contain a phenyl radical which may be substituted, or they each represent a cycloalkyl group having 5 to 20 carbon atoms and a 5 to 12 membered ring;
$R_2$ and $R_2'$ each represent hydrogen, a lower straight chain alkyl group, an optionally substituted phenyl group or the same as $R_1$;
$R_3$ and $R_3'$ and also $R_4$ and $R_5$ each represent hydrogen or a lower alkyl group;
$R_6$ represents hydrogen, an alkyl group having 1 to 19 carbon atoms, or an oxa-alkyl or thia-alkyl group having 2–19 carbon atoms;
$R_7$ represents hydrogen or the methyl group; and
$R_8$ represents hydrogen or the methyl group and, in addition, when $R_7$ is hydrogen, it also represents an alkyl group having 2 to 6 carbon atoms,
which compounds are useful as antioxidants, especially for the protection of oxidation-sensitive organic materials such as polyolefins, as well as such materials protected therewith and the use of such compounds for such protection.

This application is a division of our application Ser. No. 613,730, filed Feb. 3, 1967.
This invention relates to new, sulphur-containing antioxidants, a process for the production thereof, their use for the protection of organic materials sensitive to oxidation as well as, as industrial products, organic materials protected against deterioration due to oxidation, by a small content of such novel antioxidant.
The stabilising of polyolefins against the injurious influence of atmospheric oxygen with antioxidants having a phenol foundation, is known. The stabilising action of these active substances is often supported by so-called synergists, e.g., by thiodialkane dicarboxylic acid derivatives such as β-thiodipropionic acid esters and amides. Such mixtures of synergists, however, have some disadvantages; for example, it is necessary to carefully adjust the proportions of the components of the mixture. Also, thiodialkane dicarboxylic acid derivatives are easily volatile, can easily be extracted, they have a bad smell, sometimes they discolour the polyolefins to which they are added and occasionally they adversely influence the mechanical properties of the polyolefins.
It has now been found that sulphur-containing antioxidants which do not have the disadvantages given above are obtained when two mols of the same or different, preferably however, identical, hydroxyaryl compounds of Formula I

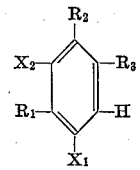    (I)

are reacted with one mol of an aldehyde of Formula II $$O=CH-CH-CH-S-\underset{R_8}{\underset{|}{C}}-R_6$$
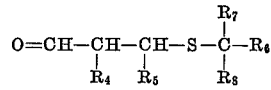    (II)

to form a compound of Formula III

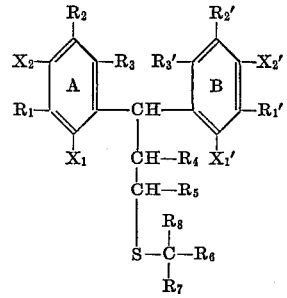    (III)

in which formulae
one of the pair $X_1$ and $X_2$ and one of the pair $X_1'$ and $X_2'$ represents the hydroxyl group and the other hydrogen;
$R_1$ and $R_1'$ each represent an alkyl group having, in all, 3 to 20 carbon atoms in a chain which is branched at the α-carbon atom, which alkyl group can contain a phenyl radical which may be substituted, or they each represent a cycloalkyl group having 5 to 20 carbon atoms and a 5 to 12 membered ring;
each of $R_2$ and $R_2'$ has the same meaning as $R_1$, supra, or represents hydrogen, a lower straight chain alkyl group or an optionally substituted phenyl group;
$R_3$ and $R_3'$ as well as $R_4$ and $R_5$ each represent hydrogen or a lower alkyl group;
$R_6$ represents hydrogen, an alkyl group having from 1 to 19 carbon atoms, or an oxa-alkyl or thia-alkyl group having 2–19 carbon atoms;
$R_7$ represents hydrogen or the methyl group; and
$R_8$ represents hydrogen or the methyl group and, in addition, when $R_7$ is hydrogen, $R_8$ also represents an alkyl group having 2 to 6 carbon atoms.

Compounds of Formula III in which the benzene rings A and B are identically substituted are preferred because the production of these compounds is much simpler than that of the unsymmetrically substituted compounds. In the preferred symmetrical compounds one of the pairs $X_1$, $X_1'$ and $X_2$, $X_2'$ represents two hydroxyl groups and the other pair represents two hydrogen atoms.
Compounds analogous to those of Formula III but containing straight-chain alkyl groups as $R_1$ and/or $R_1'$ are not useful as antioxidants for the protection of such oxidation-sensitive materials as polypropylene, since they are liable to be decomposed by the action of alkali metal-containing impurities which are frequently present in the polymeric materials requiring protection by antioxidant adjuvants.

As alkyl groups having 3 to 20 carbon atoms in a chain branched at the α-carbon atom: when present in the position of $R_1$ or $R_1'$ and/or in the position of $R_2$ or $R_2'$, the isopropyl, sec.butyl, tert.butyl, sec.amyl, tert.amyl, isoamyl or tert.octyl group are mentioned. Should such alkyl groups contain a phenyl radical then they are, in particular, the α-phenethyl group; when the phenyl radical is substituted then such substituents are e.g., halogens such as fluorine, chlorine or bromine, but preferably lower alkyl or lower alkoxy groups, having at most 4 carbon atoms. Cycloalkyl groups having 5 to 20 carbon atoms and a 5- to 12-membered ring, when present in $R_1$ or $R_1'$ and/or $R_2$ or $R_2'$, are, in particular, unsubstituted cycloalkyl such as the cyclopentyl, cyclohexyl, α-methyl-cyclohexyl or cyclododecyl group, or lower alkyl-substituted cycloalkyl.

Lower straight chain alkyl groups in the position of $R_2$ or $R_2'$ advantageously have 1 to 6 carbon atoms.

Lower alkyl groups in the position of $R_3$ or $R_3'$ as well as in those of $R_4$, $R_5$ and $R_8$ advantageously contain 1 to 6 carbon atoms; these alkyl groups as well as the alkyl groups in the position of $R_6$ can have a straight or branched chain. Examples of thia-alkyl and oxa-alkyl groups as $R_6$ are, e.g., octylthiomethyl, dodecyloxymethyl, 1,1,3,3-tetramethylbutyl-thiomethyl and 3-methoxypropyl.

In particularly preferred compounds of Formula III, $X_1$ and $X_1'$ each represent hydrogen,
$X_2$ and $X_2'$ each represent the hydroxyl group,
$R_1$ and $R_1'$ each represent the tert.butyl group,
$R_2$ and $R_2'$ each represent hydrogen, a lower alkyl or especially the methyl or tert.butyl group,
$R_3$ and $R_3'$ each represent hydrogen or the methyl group,
$R_4$ represents hydrogen, and
$R_5$ represents hydrogen or the methyl group.

In preferred compounds of Formula III $R_6$ represents an alkyl radical having 9 to 19, particularly 10 to 17, carbon atoms, or a thia-alkyl radical of 9 to 19 carbon atoms, as such radicals produce a less unpleasant smell and promote good tolerance with polyolefins. In those cases where an unpleasant smell is of no great importance, compounds of Formula III wherein $R_6$ is a lower alkyl or lower alkylthio-lower alkyl radical can also be used.

$R_7$ and $R_8$ advantageously represent hydrogen, as only those mercapto aldehydes of Formula II which are derived from primary mercaptans yield uniform reaction products which can easily be worked up.

The hydroxyaryl compounds of Formula I usable as starting compounds are known or can be produced in a known manner. Examples of such starting compounds are:

2-isopropyl phenol,
2-tert.butyl phenol,
2-tert.amyl phenol,
2-isopropyl-4-methyl- or -ethyl-phenol,
2-tert.butyl-4-methyl- or -ethyl-phenol,
2-α,α,γ,γ-tetramethylbutyl-4-methyl, or -ethyl-phenol,
2,4-di-tert.butyl phenol,
2-α-phenylethyl-4-phenylphenol,
2-cyclohexyl-4-phenylphenol,
2-(1-methylcyclohexyl)-4-methyl phenol,
2-cyclododecyl-4-methyl phenol,
2-tert.butyl-4-(j-methoxyphenyl)-phenol,
2-tert.butyl-4-(p-methylphenyl)-phenol,
2-isopropyl-5-methyl- or -ethyl-phenol,
2-tert.butyl-5-methyl- or -ethyl-phenol,
2-tert.amyl-5-methyl- or -ethyl-phenol,
2-tert.octyl-5-methyl- or -ethyl-phenol,
2-α,α,γ,γ-tertamethylbutyl-5-methyl- or -ethyl-phenol,
2-α-phenylethyl-5-methyl phenol,
2-cyclopentyl-5-methyl phenol,
2-[α(4-methylphenyl)-ethyl]-5-methyl phenol,
2-isopropyl-6-methyl- or -ethyl-phenol,
2-tert.butyl-6-methyl- or -ethyl-phenol,
2-α,α,γ,γ-tetramethylbutyl-6-methyl- or -ethyl-phenol, 2,6-di-tert.butyl phenor or mixtures of the isomeric 2-tetramethyloctyl-5-methyl phenols containing, e.g., 2-(1',3',5',7'-tetramethyloctyl)-5-methyl phenol,
2-(1',3',3',5'-tetramethyloctyl)-5-methyl phenol,
2-(2-methyl-nonadecyl)-4-methylphenol,
2-[1-(4-methoxyphenyl)-ethyl]-4-methylphenol,
2,6-diisopropyl-phenol,
2,6-bis-(1-ethyl-1-methylpropyl)-phenol,
2,6-bis-(2-methylnonadecyl)-phenol,
2,6-bis-(1-phenylethyl)-phenol,
2,6-bis-[1-(4-ethylphenyl)ethyl]-phenol,
2,6-bis-[1-(4-butoxyphenyl)-ethyl]-phenol,
2,6-bis[1-(4-chlorophenyl)-ethyl]-phenol,
2,6-bis-[1-(4-bromophenyl)-ethyl]-phenol,
2,6-bis-[1-(2-fluorophenyl)-ethyl]-phenol,
2-[1-(4-chlorophenyl)-ethyl]-phenol,
2-[1-(4-chlorophenyl)-ethyl]-6-methyl-phenol,
2-(3,5-dibromophenyl)-6-methyl-phenol,
2-[1-(3,5-dibromophenyl)-ethyl]-6-methyl-phenol,
2-tert.butyl-4-(p-chlorophenyl)-phenol,
2-tert.amyl-4-(m-bromophenyl)-phenol or
2-cyclohexyl-4-(o-fluorophenyl)-phenol;
2-(1-tetradecyl-cyclohexyl)-4-methyl-phenol

[prepared by condensation of benzene and myristic acid chloride in the presence of a Friedel Crafts catalyst, hydrogenation to tetradecyl-cyclohexene and reaction of the latter with p-cresol in the presence of concentrated sulphuric acid as catalyst]; and 2-(1-tetradecyl-cyclohexyl)-6-methyl-phenol (prepared by reaction of tetradecylcyclohexene with o-cresol in the presence of aluminum o-cresolate as catalyst). The 2,5-disubstituted phenols of Formula I are preferred for reasons of synthesis.

The sulphur-containing aldehydes of Formula II usable as starting compounds are obtained by known processes by adding a mercaptan of Formula V

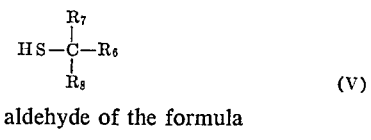

to a α,β-unsaturated aldehyde of the formula $$O=CH-\underset{R_4}{\overset{R_5}{C}}-CH$$

wherein $R_4$, $R_5$, $R_6$, $R_7$ and $R_8$ have the meanings given in Formula III.

Examples of sulphur-containing aldehydes of Formula II are the addition products of the following mercaptans: methyl mercaptan, ethyl mercaptan, propyl mercaptan, butyl mercaptan, octyl mercaptan, dodecyl mercaptan, tetradecyl mercaptan, hexadecyl mercaptan, octadecyl mercaptan, eicosyl mercaptan, 2-ethyl-hexyl mercaptan, 2,2-dimethyloctyl mercaptan, 2-octyl-thio-ethyl mercaptan, 2-(1,1,3,3-tetramethylbutylthio)-ethyl mercaptan, 2-dodecyloxy-ethyl mercaptan, 2-dodecylthio-ethyl mercaptan, 4-methoxy-butyl mercaptan, 2-methoxy-ethyl mercaptan, 2-methylthio-ethyl mercaptan, 4-dodecyloxy-butyl mercaptan, 2-octadecylthio-ethyl mercaptan, 2-methylthio-ethyl mercaptan, 2-methoxy-ethyl mercaptan, 2-octadecyloxy-ethyl mercaptan, 4-dodecylthio-butyl mercaptan, with the following α,β-unsaturated aldehydes: acrolein, crotonaldehyde, α-methyl acrolein, pentenal.

The hydroxyaryl compound of Formula I is reacted either direct with the sulphur-containing aldehyde of Formula II, or advantageously the reaction partners are reacted in an organic solvent. Examples of organic solvents are aliphatic hydrocarbons such as benzene fractions boiling between 50 and 250° C., aliphatic halogenated hydrocarbons such as methylene chloride, trichlorethylene or tetrachlorethylene, aromatic hydrocarbons such as toluene or xylene, aromatic halogenated hydrocarbons such as chlorobenzene or dichlorobenzenes, also low fatty acids such as formic, acetic or propionic acid, aliphatic alcohols such as low alkanols like methanol, ethanol or isopropanol, or ethers such as diethyl ether or anisol. The condensation of the aldehydes of Formula II with the hydroxyaryl compounds of Formula I is performed advantageously under the influence of acid or basic catalysts. Suitable catalysts are, e.g., strong proton acids or strong Lewis acids, the $\frac{1}{100}$ N solutions of which in water have a maximal pH of 3. As examples can be mentioned: concentrated sulphuric acid, concentrated phosphoric acid, hydrohalic acids such as hydrochloric or hydrobromic acid, or fluoroboride or adducts thereof with weak bases such as borofluoride/dimethyl ether or diethyl ether adducts. Concentrated sulphuric acid is preferred because it serves simultaneously as solvent and as acid catalyst.

The acids mentioned can be absorbed by clays, e.g., montmorillonite or bentonite, and used in this form as catalysts.

Generally, the amount of acid used as catalyst is not critical; it can be 0.2% by weight, calculated on the hydroxyaryl compound of Formula I, up to a multiple amount thereof.

A modification of the process according to the invention for the production of compounds of Formula III consists in condensing 1 mole of a diphenylmethane compound of Formula IV

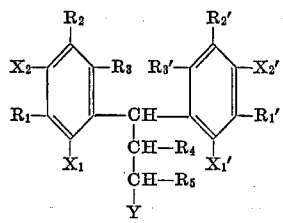

with a mercaptan of the formula

to form a compound of Formula III. In the above formulae, $X_1$, $X_1'$, $X_2$, $X_2'$, $R_1$, $R_1'$, $R_2$, $R_2'$, $R_3$, $R_3'$ and $R_4$ to $R_8$ have the meanings given in Formula III and Y is a substituent which can be split off as nonbasic HY, in particular halogen such as chlorine or bromine, but also a hydrocarbon oxy group such as the methoxy, ethoxy or phenoxy group, or an arylsulphonyloxy group such as the benzene sulphonyloxy or p-toluene sulphonyloxy group.

The diphenylmethane compounds of Formula IV are obtained, for example, by reacting hydroxyaryl compounds of Formula I with aldehydes of Formula VI

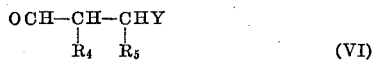

The reaction conditions in this case are substantially the same as those described for the reaction of aldehydes of Formula II with hydroxyaryl compounds of Formula I.

Examples of aldehydes of Formula VI, are, in particular β-chloropropionaldehyde, β-bromopropionaldehyde, β-chlorocrotonaldehyde and β-bromocrotonaldehyde, but also β-ethoxypropionaldehyde, β-methoxycrotonaldehyde and β-phenoxycrotonaldehyde can be used.

As mercaptans of Formula V both those in which at least one of $R_7$ and $R_8$ is hydrogen as well as those wherein both $R_7$ and $R_8$ are not hydrogen, can be used. Examples of the former are those described in the first process for the production of starting materials of Formula II. Examples of the latter are: 1,1-dimethyldecyl mercaptan, 1,1,3,3,5,5-hexamethyloctyl mercaptan, 1-pentyl-hexyl mercaptan, 1,1,3,3-tetramethyl-butyl mercaptan, tert. butyl mercaptan or 1-ethyl-butyl mercaptan, as well as mixtures of such mercaptans.

The condensation of the diphenylmethane compounds of Formula IV with the mercaptans of Formula V is performed advantageously in an organic solvent and in the presence of an acid binding agent. Of the solvents given in the first process, the nonacid organic solvents as well as the amides of the acids there mentioned are suitable, e.g., dimethyl formamide or dimethyl acetamide. In addition, sulphur-containing solvents such as dimethyl sulfoxide or dimethyl sulphone can also be used. The bases usual in the technique are used as acid binding agents for this production process, mainly oxides, hydroxides and, optionally, basic carbonates of alkali and alkaline earth metals, e.g., magnesium oxide or sodium, potassium or barium hydroxides, or lithium or calcium carbonate, also alcoholates of alkali and alkaline earth metals, e.g., sodium methylate, ethylate, isopropylate, tert.butylate or magnesium methylate, also, however, organic nitrogen bases which cannot be condensed such as triethylamine or pyridine.

A further modification of the process according to the invention for the production of compounds of Formula III consists in reacting 1 mol of a diphenylmethane compound of Formula II

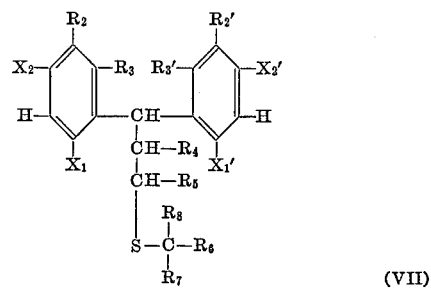

wherein $R_2$, $R_2'$, $R_3$, $R_3'$, $R_4$, $R_5$, $R_6$, $R_7$, $R_8$, $X_1'$, $X_2$ and $X_3'$ have the meanings given in Formula III with olefins of Formula VIII

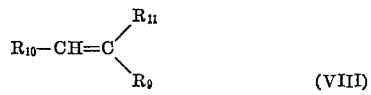

wherein $R_9$ represents hydrogen or the methyl group, $R_{10}$ represents hydrogen or a lower alkyl group, $R_{11}$ represents an alkyl group having 1 to 18 carbon atoms, or an optionally substituted phenyl group, or $R_{10}$ and $R_{11}$ together represent a polymethylene group optionally substituted by low alkyl groups, which polymethylene group contains 3 to 10 methylene groups and, in all, 3 to 18 carbon atoms, the reaction being performed in the presence of acid catalysts.

Examples of olefins of Formula VIII are propylene, 1-butene, 2-butene, isobutylene, 2-methyl - 2 - butene, 2-methyl-1-butene, di-isobutylene, tri-isobutylene, cyclopentene, methylcyclopentene, cyclohexene, cyclododecene, styrene and α-methyl-styrene. Isobutylene and the mixture of 2-methyl butenes are preferred.

The acid agents mentioned above in the condensation of Compounds IV and V are used as acid catalysts for the alkylation. Sulphuric acid, acidic clays and borofluoride and adducts of the latter are preferred. If desired, the reaction can be performed in inert organic solvents, particularly hydrocarbons. If $R_2$ and $R_2'$ in diphenylmethane derivatives of Formula VII are hydrogen then alkylation can be performed in these positions also. A large excess of olefin of Formula VIII is necessary for such polyalkylations.

Examples of materials which are sensitive to oxidation, and which are protected with the hydroxyaryl compounds according to the invention of Formula III are high molecular monomeric substances such as hydrocarbons, e.g., mineral oils; esters, e.g., animal or vegetable fats, oils, or waxes, or oils and waxes having synthetic ester foundation, and also compounds containing ether or aldehyde groups or ethylenically unsaturated groups or tertiary carbon atoms.

In particular however, polymeric compounds can be protected, e.g., natural polymers such as rubber and, principally, synthetic polymers. Both polyaddition as well as polycondensation products are meant by synthetic polymeric compounds. Examples of polyaddition compounds are the polymers of styrene, butadiene, isoprene, also the co-polymers, poly-polymers and graft polymers of these compounds themselves as well as with acrylonitrile, acrylic and methacrylic acid esters and, possibly, with vinyl esters and vinyl chloride, as well as polyolefins. Examples of polycondensation products are polycarbonates, synthetic polyamides such as polyamide 6, 6.6 and 11, or polyacetals. The antioxidants according to the invention are used chiefly for the stabilisation of polyolefins. By polyolefins are meant polymers from olefins having 2–10 carbon atoms, the olefins having 3–10 carbon atoms being α-olefins such as butene-1, pentene-1 or methylpentene-1. In particular, the new antioxidants are suitable for the stabilisation of polyethylene and isotactic polypropylene. These polyolefins have a tendency to autooxidation which results, e.g., in a worsening of the mechanical and electric properties as well as discolouration.

In order to protect the oxidation-sensitive, organic material, that is polyolefins or mixtures thereof, from the disadvantageous effect of oxygen, the sulphur-containing antioxidants of Formula III are incorporated thereinto. In the case of polyolefins, for example, this is done, depending on the type thereof, by working in these compounds and, optionally, other additives in the melt by the usual technical methods before or during moulding, or by mixing this carrier material with solutions or slurries of the antioxidants according to the invention and, optionally, other additives, in organic solvents and subsequently evaporating the latter. Other additives which can be used are:

Antioxidants of different structure, e.g., esters of 4-hydroxy-3,5-di-tert.butyl-β-carboxyethylbenzene, esters of 4-hydroxy-3,5-di-tert.butyl-benzyl phosphonic acid; 2,2'- or 4,4'-dihydroxy-3,3'-di-tert.-butyl-5,5'- or -6.6'- dimethyldiphenyl sulphide or -diphenyl methane; 2,6-bis-(2-hydroxy-3-tert.butyl-5-methylbenzyl)-4-alkyl phenols, 2,4,6-tris-(4 - hydroxy - 3,5 - di - tert.butylbenzyl)-mesitylene, 2,4-bis-octylmercapto - 6 - (4 - hydroxy-3,5-di-tert.butylphenylamino)-s-triazine or 2-octylmercapto-4,6-bis-(4-hydroxy-3,5-di-tert.butylphenoxy)-s-triazine;

So-called chelators such as tridecyl phosphite, trioctadecyl phosphite, also metal deactivators such as salicylalsalicyl hydrazide or bis-salicylate-1,2-propylenediamine;

UV absorbers such as 2-hydroxy-4-alkyloxy or 4-benzyloxy benzophenones or 2-(2 - hydroxyalkylphenyl)-benzotriazoles and their 5-chloro derivatives, So-called synergists such as thiodipropionic acid dilauryl and dioctadecyl esters, And also, depending on the intended use, pigments, e.g., carbon; fillers, optical brighteners.

The hydroxyaryl compounds according to the invention of Formula III are used in amounts of 0.05 to 5% by weight, in particular 0.1 to 1% by weight, calculated on the material to be protected.

Polyolefins having a content of compounds of Formula III are substantially protected against damage due to oxidation. Compared with comparable, previously known compounds, the antioxidants according to the invention are distinguished by a better action. Above all, they enable the amount of synergists usually used to be greatly reduced or, possibly, completely eliminated and they thus make possible the production of polyolefin moulds and threads, the smell of which is completely acceptable and the protection of which has improved stability to washing. In certain cases, the new compounds also have the advantage of being less deactivated by fillers or pigments such as are often admixed with the polyolefin compositions.

Because of their good action and lack of smell coupled with their easiness of production from technically cheap crude materials which are available in good quality, the classes of compounds of the following Formulae IX and X are particularly advantageous:

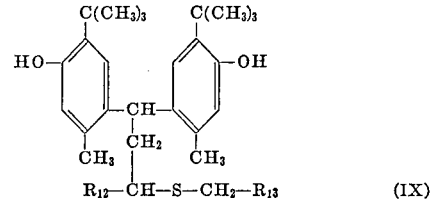

(IX)

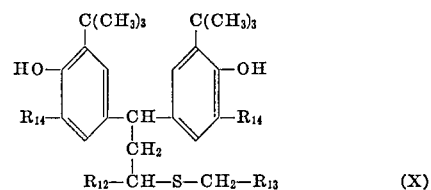

(X)

wherein $R_{12}$ represents hydrogen or a methyl group, $R_{13}$ represents an alkyl group of 9 to 19 carbon atoms or a thioalkyl group of 9 to 19 carbon atoms, but the alkyl group in the latter having preferably from 8 to 14 carbon atoms, $R_{14}$ represents a lower alkyl, especially a methyl or tert. butyl group.

Examples of compounds of Formula IX are those in which $R_{12}$ and $R_{13}$ represent the groups shown below:

| $R_{12}$ | $R_{13}$ | F.P., °C |
|---|---|---|
| H | n-$C_{11}H_{23}$- | 54 |
| H | n-$C_{17}H_{35}$- | 46 |
| $CH_3$ | n-$C_{11}H_{23}$- | 122 |
| $CH_3$ | n-$C_{17}H_{35}$- | 106 |

The following nonlimitative examples illustrate the invention further. The temperatures are given therein in degrees centigrade. Percentages are by weight unless expressly stated otherwise.

EXAMPLE 1

(a) 73.5 g. of crotonaldehyde are added dropwise to a mixture of 202 g. of dodecyl mercaptan and 2 g. of triethylamine, the addition being made within 40 minutes under an atmosphere of nitrogen at 50–55°. The reaction mixture is kept for half an hour at 80–90°, then cooled and then added dropwise within a further half hour while stirring at 5 to 10°, to a mixture of 328 g. of 2-tert.butyl-5-methyl-phenol, 1000 ml. of glacial acetic acid and 100 g. of 96% sulphuric acid. When producing this latter mixture care must be taken that the temperature does not exceed 5°. On completion of the addition, the reaction solution is stirred for 3 hours at room temperature whereupon the 1,1-bis-(2-methyl-4-hydroxy-5-tert.butylphenyl)-3-dodecylthiobutane of the formula

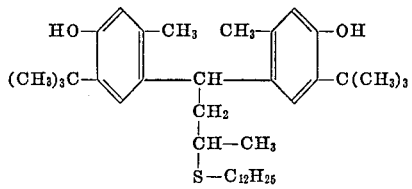

precipitates. After recrystallization from methanol, the pure product melts at 121–122°.

(b) If, in this example, instead of the 328 g. of 2-tert.butyl-5-methyl-phenol, 380 g. of 2-cyclohexyl-5-methylphenol, 356 g. of 2-tert.amyl-5-methyl-phenol or 440 g. of 2-tert.octyl-5-methyl-phenol are used, then with otherwise the same procedure as described, 1,1-bis-(2-methyl-4-hydroxy-5-cyclohexylphenyl)-3-dodecylthiobutane, 1,1-bis-(2-methyl-4-hydroxy-5-tert.amylphenyl)-3 - dodecylthiobutane or 1,1-bis-(2-methyl - 4 - hydroxy-5-tert.octylphenyl)-3-dodecylthiobutane respectively is obtained.

(c) If, instead of the 328 g. of 2-tert.butyl-5-methyl-phenol, a mixture of 164 g. of 2-tert.butyl-5-methyl-phenol and 178 g. of 2-tert.amyl-5-methyl-phenol is used and otherwise the same procedure is followed, then a mixture is obtained which contains about the same amounts of 1,1-bis-(2-methyl-4-hydroxy-5-tert.butylphenyl)-3 - dodecylthiobutane, 1,1-bis-(2-methyl - 4 - hydroxy - 5 - tert.amylphenyl)-3-dodecylthiobutane and 1-(2-methyl-4-hydroxy-5-tert.butylphenyl)-1-(2-methyl-4-hydroxy-5 - tert.amylphenyl)-3-dodecylthiobutane.

(d) If, instead of 202 g. of dodecyl mercaptan, 262 g. of 2-dodecylthioethyl mercaptan (B.P.$_{10}$ 204°) or 180 g. of 2-octyloxyethyl mercaptan (B.P.$_{10}$ 170–175°) are used and otherwise the same procedure is followed, then 1,1-bis-(2-methyl-4-hydroxy-5-tert.butylphenyl)-3-(2-dodecylthioethyl)-thiobutane or 1,1-bis-(2-methyl-4-hydroxy-5-tert.butylphenyl)-3-(2-octyloxyethyl)-thiobutane are obtained.

(e) By repeating Example 1, but using in lieu of 328 g. of 2-tert.butyl-5-methyl-phenol, a mixture of 164 g. of 2-tert.butyl-4-methyl-phenol and 178 g. of 2-tert.amyl-5-methyl-phenol, a mixture is obtained which consists of about equal amounts of 1-(2-hydroxy-3 - tert.butyl - 5 - methylphenyl)-1-(2-methyl-4 - hydroxy - 5 - tert.amylphenyl)-3-dodecylthiobutane, 1,1 - bis-(2-hydroxy-3-tert.butyl-5-methylphenyl)-3-dodecylthiobutane and 1,1 - bis-(2-methyl-4-hydroxy-tert.amylphenyl) - 3 - dodecylthiobutane.

The mixtures of diphenyl - 3 - dodecylthiobutanes obtained as end-products under (c) and (e), supra, are separated into their components by well-known chromatographic procedures. However, it is much more economical to use the mixtures as obtained directly as antioxidants in such organic polymeric material as polypropylene. The latter is thereby stabilized vary satisfactorily against deterioration by oxidation. Shaped articles made therefrom such as cups, plates, dishes and the like do not develop an unpleasant odor when stored for longer periods of time, as may be the case when other antioxidants have been used as stabilizers in the polypropylene.

EXAMPLE 2

32.8 g. of 2-tert.butyl - 5 - methyl-phenol and 14.6 g. of 3 - butylthiopropionaldehyde are dissolved in 200 ml. of ligroin. Hydrogen chloride is introduced into this solution for 2 hours while cooling at 0–4°, whereupon the colour changes from yellow to deep green. After being left to stand for 12 hours at room temperature, the reaction solution is extracted with water and then the ligroin is evaporated off under vacuum to 60 ml., whereupon the 1,1 - bis - (2 - methyl - 4 - hydroxy - 5 - tert.butylphenyl)-3-butylthiopropane of the formula

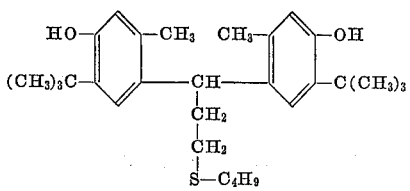

precipitates. After recrystallisation from ligroin, it melts at 145°.

The 3-butylthiopropionaldehyde used is obtained as follows. 180 g. of butyl mercaptan are added dropwise to 112 g. of acrolein and 0.5 g. of triethylamine at 0°. The reaction mixture obtained is stirred for 1 hour at room temperature, made neutral with acetic acid and then distilled. The fraction which boils at 105–106°/15 torr is the desired aldehyde. It is of sufficient purity for the further reactions.

EXAMPLE 3

32.8 g. of 2 - tert.butyl - 4 - methyl-phenol and 14.6 g. of 3-butylthiopropionaldehyde are dissolved in 200 ml. of toluene. Hydrogen chloride is introduced into this solution for 2 hours while cooling at 0–4°. After leaving to stand for 24 hours at room temperature, water is added to the reaction mixture, the organic solution is washed free of acid and concentrated to dryness. After distillation of the residue, 1,1-bis-(2-hydroxy - 3 - tert.butyl - 5 - methylphenyl)-3-butylthiopropane of the formula

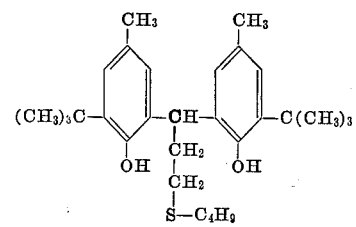

is obtained at 195–200°/0.005 torr.

EXAMPLE 4

10.3 g. of 2,6-di-tert.butyl-phenol and 15 g. of borofluoride diethyl ether adduct (having about 48% BF$_3$ content) are dissolved in 50 ml. of ethanol. 6.8 g. of 3-dodecylthiobutyraldehyde are added dropwise to the solution obtained at 0–10° The temperature then rises to about 50° and, after completion of the reaction, the mixture is stirred for 48 hours at 40°. After cooling, the 1,1-bis-(4-hydroxy - 3,5 - di-tert.butylphenyl)-3-dodecylthiobutane of the formula

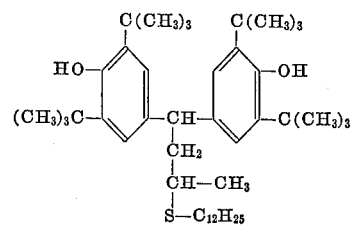

crystallises out and, after purification by recrystallisation from isopropanol, it melts at 86°.

A somewhat less pure product is obtained if the reaction is performed without ethanol. In this case, however, the reaction temperature must be kept below 60° by cooling.

EXAMPLE 5

82 g. of 2-tert.butyl - 5 - methyl-phenol are dissolved at 0–5° in 80 ml. of glacial acetic acid and 25 g. of 96% sulphuric acid and, at 0–5°, a solution of β-chloropropionaldehyde, obtained by saturating a mixture of 17.5 g. of crotonaldehyde and 30 ml. of glacial acetic acid with hydrogen chloride, is added dropwise. After 1 hour, the mixture obtained is heated to room temperature and kept for 1 hour at this temperature. 100 ml. of 80% acetic acid are then added to the reaction mixture whereupon the 1,1 - bis - (2 - methyl - 4 - hydroxy-5-tert.butylphenyl)-3-chlorobutane precipitates. After washing with water, the product is recrystallised from methanol. It melts at 206°.

21 g. of this 1,1 - bis - (2 - methyl - 4 - hydroxy-5-tert.butylphenyl)-3-chlorobutane are dissolved in 30 ml. of butanol and the solution is added dropwise to a 25° warm solution of 10.1 g. of dodecyl mercaptan and 8.1 g. of sodium methylate in 30 ml. of butanol. After refluxing for 12 hours, the reaction mixture is neutralised with acetic acid, extracted with toluene, the toluene solution is washed free of acid with water and the toluene is distilled off. Nonreacted starting product is removed from the residue by fractionated crystallisation from aqueous methanol, a little 1,1-bis-(2-methyl - 4 - hydroxy-5-tert.butylphenyl)-3-chlorobutane first crystallising. The product obtained in later fractions is identical with the 1,1 - bis-(2 - methyl - 4 - hydroxy - 5 - tert.butylphenyl)-3-dodecylthiobutane obtained according to Example 1.

EXAMPLE 6

82 g. of 2-tert. butyl-5-methyl-phenol are dissolved at 0–5° in 80 ml. of glacial acetic acid and 25 g. of 96% sulphuric acid. A solution of 17.5 g. of crotonaldehyde and 30 ml. of glacial acetic acid which has been saturated for 20 minutes at —10° with hydrogen bromide, is added dropwise within 2 hours to the above solution at 0–5°. After 1 hour, the reaction mixture is heated to room temperature and kept for 1 hour at this temperature. 100 ml. of 80% acetic acid are then added to the mixture whereupon the 1,1-bis-(2-methyl-4-hydroxy-5-tert.-butylphenyl)-3-bromobutane precipitates. After washing with water, the product is recrystallised from methanol. It melts at 216°.

46.1 g. of this 1,1-bis-(2-methyl-4-hydroxy-5-tert.-butylphenyl)-3-bromobutane are dissolved in 100 ml. of dimethyl formamide. This solution is added dropwise to a solution of 28.6 g. of octadecyl mercaptan and 16.2 g. of sodium methylate in 100 ml. of dimethyl formamide at 100°, and the mixture is stirred for 2 hours at this temperature. 200 ml. of water are then added to the reaction mixture and the precipitated product is recrystallised from hexane. The 1,1-bis-(3-tert.butyl-4-hydroxy-6-methylphenyl)-3-octadecylthiobutane obtained of the formula

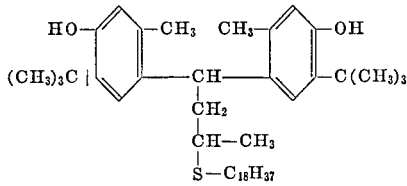

melts at 106°.

If, instead of the addition product of hydrogen bromide to crotonaldehyde, the addition product of hydrogen bromide to methacrylaldehyde is used, then with otherwise the same procedure, 1,1-bis-(3-tert.butyl-4-hydroxy-6-methylphenyl)-2-methyl-3-octadecylthiopropane is obtained.

If, instead of the 28.6 g. of octadecyl mercaptan, 28.6 g. of tert. dodecyl mercaptan are used, then with otherwise the same procedure as described, 1,1-bis-(3-tert.butyl-4-hydroxy-6-methylphenyl)-3-tert. dodecylthiobutane is obtained.

EXAMPLE 7

19 g. of phenol and 27.2 g. of 3-dodecylthiobutyraldehyde are dissolved in 50 ml. of glacial acetic acid and the solution is added dropwise at 0–10° within 1 hour to 60 g. of sulphuric acid whereupon the mixture is stirred overnight. After diluting with water, the 1,1-bis-(4-hydroxyphenyl)-3-dodecylthiobutane is isolated by column chromatography.

0.1 g. of concentrated sulphuric acid are added to 44 g. of 1,1-bis-(4-hydroxyphenyl)-3-dodecylthiobutane and, at 80°, 25 g. of isobutylene are introduced within 2 hours. After removal of the sulphuric acid by washing the reaction mixture with water, the same product as described in Example 4 is obtained.

Instead of sulphuric acid, also phosphoric acid, acidic clays and borofluoride etherate can be used with similar success.

EXAMPLE 8

50 g. of polypropylene powder (density: 0.94, crystalline M.P. 166–167°) are intimately mixed with one of the antioxidants given in the following Table I in the proportions given therein, the mixing being performed at room temperature. The mixture, in the form of a flowing melt, is homogenised for 10 minutes in a laboratory kneader heated to 200°. The mass is then pressed at 200° into sheets of 1 mm strength, from which sample strips of the dimension 140 x 10 x 1 mm. are cut.

The time is then determined after which a sample shows signs of decomposition, e.g., brittleness, in an air circulating oven at 149°.

TABLE I

| Test No. | Compound | Antioxidant | Time, days |
|---|---|---|---|
| (a) | | None | 1 |
| (b) | I | 0.1 g. of 1,1,3-tris-(4-hydoxy-3-tert. butyl-6-methylphenyl)-butane (known stabiliser). | 9 |
| (c) | II | 0.1 g. of 1,1-bis(3-tert.butyl-4-hydroxy-6-methylphenyl)-3-dodecyl-thiobutane. | 27 |

As can be seen from the table, the stabilising action of the antioxidant II according to the invention is clearly superior to that of the known stabiliser I.

EXAMPLE 9

50 g. of polyethylene powder (density 0.96, unstabilised) are intimately mixed with one of the antioxidants givn in the following Table II in the proportions given therein, the mixing being performed at room temperature, and the mixture is homogenised for 10 minutes on a 150–170° hot set of mixing rollers. The mass is then pressed at 180° for 6 minutes into sheets of 1 mm. thickness, from which sample strips of 140 x 10 x 1 mm. are cut.

The time is determined in which a sample begins to decompose in an air circulating oven at 120°.

TABLE II

| Amount, g. | Antioxidant | Days |
|---|---|---|
| | Without antioxidant | 33 |
| 0.01 | 1,1-bis-(2-methyl-4-hydroxy-5-tert.butylphenyl)-3-dodecylthiobutane. | 78 |
| 0.025 | do | 85 |
| 0.05 | do | 115 |
| 0.01 | 1,1-bis-(2-methyl-4-hydroxy-5-tert.butylphenyl)-3-dodecylthiopropane. | 85 |

We claim:
1. A composition comprising an organic material sensitive to oxidation selected from the group consisting of natural rubber, synthetic homopolymers and copolymers of styrene, butadiene and isoprene with ethylenically unsaturated monomers and polymers of alpha-mono-olefins having from 2–8 carbon atoms and a compound of the formula

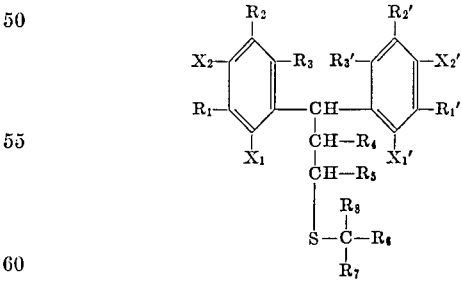

wherein
one of $X_1$ and $X_2$ and also one of $X_1'$ and $X_2'$ represents the hydroxyl group and the other two X's represent hydrogen;
each of $R_1$ and $R_1'$ represents independently (a) an alkyl group having a total of 3 to 20 carbon atoms in a chain which is branched at the α-carbon atom, which alkyl group is unsubstituted or substituted by phenyl, lower alkyl-phenyl, lower alkoxy-phenyl, chloro-phenyl, bromo-phenyl or fluoro-phenyl, or (b) a 5 to 12 membered cycloalkyl group having 5 to 20 carbon atoms;
each of $R_2$ and $R_2'$ represents (a) hydrogen, (b) lower straight-chain alkyl, (c) phenyl, (d) lower alkyl-phenyl, (e) lower alkoxy-phenyl, (f) chloro-phenyl, (g) bromo-phenyl, (h) fluoro-phenyl, (i) an alkyl group having a total of 3 to 20 carbon atoms in a chain which is branched at the α-carbon atom, which alkyl group is unsubstituted or substituted by phenyl, lower alkylphenyl or lower alkoxy-phenyl, or (j) 5 to 12 membered cycloalkyl of a total of 5 to 20 carbon atoms;

each of $R_3$ and $R_3'$, $R_4$ and $R_5$ represents hydrogen or lower alkyl;

$R_6$ represents hydrogen, alkyl of from 1 to 19 carbon atoms, oxa-alkyl of from 2 to 19 carbon atoms or thio-alkyl of from 2 to 19 carbon atoms;

$R_7$ represents hydrogen or the methyl group; and $R_8$ represents hydrogen or the methyl group and, in in addition, when $R_7$ is hydrogen, it also represents an alkyl group having 2 to 6 carbon atoms;

in an amount sufficient to protect said material against oxidative deterioration.

2. An organic material as defined in claim 1, which is a polymer of an alpha-monoolefin.

3. An organic material as defined in claim 1 which is polypropylene.

4. Polypropylene protected against deterioration by oxidation, which polypropylene contains an effective antioxidant amount of a compound of the formula

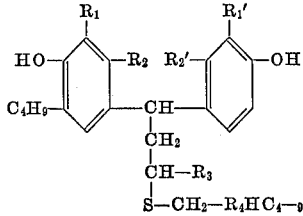

wherein each of $R_1$ and $R_1'$ represents hydrogen or lower alkyl;

each of $R_2$, $R_2'$ and $R_3$ represents hydrogen or methyl, and $R_4$ represents alkyl having 1 to 19 carbon atoms.

5. Polypropylene as defined in claim 4 wherein said compound is selected from the group consisting of:

1,1-bis-(2-methyl-4-hydroxy-5-tert.butylphenyl)-3-dodecylthiopropane,
1,1-bis-(3-tert.butyl-4-hydroxy-6-methylphenyl)-3-octadecylthiopropane,
1,1-bis-(2-methyl-4-hydroxy-5-tert.butylphenyl)-3-dodecylthiobutane,
1,1-bis-(3-tert.butyl-4-hydroxy-6-methylphenyl)-3-octadecylthiobutane,
1,1-bis-(2-methyl-4-hydroxy-5-tert.butylphenyl)-3-butylthiopropane,
1,1-bis-(2-hydroxy-3-tert.butyl-5-methylphenyl)-3-butylthiopropane,
1,1-bis-(4-hydroxy-3,5-di-tert.butylphenyl)-3-dodecylthiobutane.

References Cited
UNITED STATES PATENTS 2,831,030  4/1958  Chenicek _____ 260—45.95
2,843,577  7/1958  Friedlander _____ 260—45.95
2,967,846  1/1961  Hawkins et al. ____ 260—45.95
3,181,971  5/1965  Raymer _____ 260—45.95

HOSEA E. TAYLOR, Jr., Primary Examiner

U.S. Cl. X.R.

99—163; 106—263, 270; 260—41, 41.5, 45.8, 45.85, 45.9, 398.5, 609

UNITED STATES PATENT OFFICE
CERTIFICATE OF CORRECTION

Patent No. 3,546,163          Dated December 8, 1970

Inventor(s) Hans Peterli and Hansjorg Heller

It is certified that error appears in the above-identified patent and that said Letters Patent are hereby corrected as shown below:

Column 13 Claim 4 - that portion of the formula

"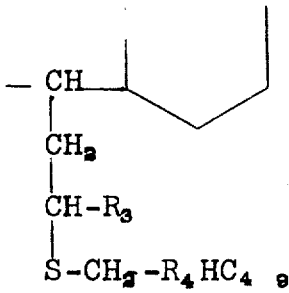" should read

"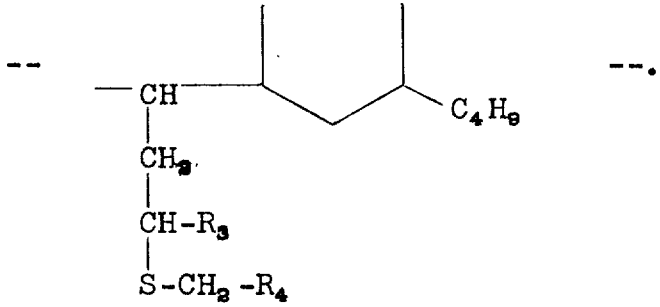".

Signed and sealed this 28th day of March 1972.

(SEAL)
Attest:

EDWARD M.FLETCHER,JR.      ROBERT GOTTSCHALK
Attesting Officer             Commissioner of Patents